TELEPHONE DIAL TONE DELAY MEASURING CIRCUIT

Filed Oct. 20, 1964 2 Sheets-Sheet 1

INVENTOR
J. W. WATKINS, JR.
BY
S. E. Hollander
ATTORNEY

April 23, 1968 J. W. WATKINS, JR 3,379,838

TELEPHONE DIAL TONE DELAY MEASURING CIRCUIT

Filed Oct. 20, 1964 2 Sheets-Sheet 2

3,379,838

TELEPHONE DIAL TONE DELAY MEASURING CIRCUIT

James W. Watkins, Jr., Pittsburgh, Pa., assignor to American Telephone and Telegraph Company, New York, N.Y., a corporation of New York Filed Oct. 20, 1964, Ser. No. 405,088
9 Claims. (Cl. 179—175)

ABSTRACT OF THE DISCLOSURE

A telephone service observing system is disclosed wherein grade of service indicia are obtained by scanning equipment common to all lines of a central office. Since a call, attempted during a period when all such common equipment is busy, will not be served as long as that busy condition persists, each time the system scans and finds that all common equipment is busy, and that condition persists beyond some predetermined time interval, that test of the system is considered a failure indicative of a "lost" call. By maintaining counts of the number of tests attempted and the number of "lost" calls occurring, an indication of the grade of service being provided may be readily determined.

This invention relates to telephone service observation equipment and more particularly to equipment for measuring time delay prior to the provision of dial tone to a calling subscriber in step-by-step telephone offices.

One of the most significant indicia of the quality of telephone service, particularly insofar as it is apparent to the average telephone customer, is the time required to receive dial tone after the subset is taken off hook. This follows, since, in virtualy all systems, dial tone is a signal to the calling customer that the common equipment is in condition to receive dial pulses representing the called station identification.

It is well known that in conventional systems common equipment is provided for reception of the dial pulses characterizing the called party identification number in lieu of equipment on a per customer basis. Consequently, for efficiency and economy, the system should be arranged to provide a predetermined and acceptable grade or quality of service at peak traffic demand as it would be economically impractical to serve all customers concurently.

Since the customers in all conventional telephone systems must compete for the common equipment, it is expected that at busy hours or peak periods, delays will be encountered. It is the nature and duration of such delays which in large measure delineate the overall quality of telephone service that the customer is receiving. For this reason, as well as for providing information on more efficiently connecting customers to central office termination equipment or redistributing such connections in order, for example, to provide sharing between customers having a relatively high traffic demand and customers having a relatively low traffic demand, that continuous surveillance of common equipment delay in general, and dial tone delay in particular, is necessary.

This problem has been attacked in the past and a number of completely operative and useful devices have been incorporated in telephone switching systems. Certain of these prior art arrangements are predicated on the generation of test calls or artifical calls which are initiated by automatic equipment in the telephone office. In response to the initiation of each test call, a time metering relay or other device is actuated and in turn operates a register if the relay is not released by the application of dial tone from the common equipment in response to the test call. Since test calling rates in a typical office may approach 900 calls per hour and since the calls are, by definition, fictitious cells rather than legitimate customer demands, it is apparent that a measure of distortion in the actual quality of dial tone delay is introduced. This results from the fact that the test calls, although fictitious, provide a real load on the common equipment and, therefore, force the legitimate customer calls to compete therewith rendering it possible for the test calls to actually provide delays in servicing the legitimate customer calls. Thus, in addition to partially obscuring the true dial tone delay "picture" in the office, the test calls may, in fact, result in a mild degradation of service to legitimate calling customers. The disadvantages of such an arrangement do not require further elaboration.

It is therefore an object of this invention to provide dial tone delay measuring without the utilization of artifical or test calls.

A further object of this invention is to provide for a measurement of dial tone delay without degrading service to calling customers during such measurement.

A further object of this invention is to provide for the measurement of dial tone delay in step-by-step offices in which the number of tests which result in delay and the number of tests which are not delayed beyond a predetermined period are independently recorded.

Still another object of this invention is to provide for the measurement of dial tone delay in step-by-step offices without substantial invasion of conventional step-by-step switching circuitry.

These and other objects and features of the invention are achieved in a specific illustrative embodiment in which a dial tone delay measuring apparatus is utilized in a step-by-step system in conjunction with "all-line-finders-busy" conductors in particular line groups.

A selector circuit sequentially tests terminals to which "all-line-finders-busy" conductors are connected. As is well known in step-by-step practice, the latter conductors have a reference potential, e.g., a ground potential applied thereto, when all of the line finders in the respective group are occupied.

A suitable arrangement for the application of a ground potential to an all-line-finders-busy conductor is shown in Patent 2,210,068 of T. L. Dimond of Aug. 6, 1940, which is herewith incorporated by reference as though fully shown herein.

The apparatus disclosed in the Dimond patent for applying a ground potential to the "all-line-finders-busy" conductor (no reference designation) connected to busy register relay ABR of FIG. 2 is shown herein symbolically by switches 140, etc.

The advent of an all-line-finders-busy condition in a group under test applies a ground condition to a selector terminal which in turn causes the operation of a relay in series therewith. The selector itself is advanced at a uniform rate of one terminal per second. Thus, when the selector is advanced to the fourth terminal and three seconds have elapsed, the continued operation of the relay, indicative of a sustained all-line-finders-busy condition for a period of at least three seconds, causes the scoring of a delay counter. The philosophy employed in registering a dial tone delay of at least three seconds is founded on the rationale that since all line finders in the group under test have been busy for at least three seconds, dial tone has been denied to the substations in that line group during the same interval; i.e., none of the substations could possibly obtain access to a first selector to receive the dial pulses in view of the all-line-finders-busy condition.

Additional facilities are provided for scanning various numbers of line groups and for resetting the selector switches when less than a full complement of line groups is to be tested. Moreover, facilities are also provided for maintaining a running count of all tests independent of the occurrence of a dial tone delay in excess of a predetermined interval.

Since the test equipment examines the conventional all-line-finders-busy conductors for the application of a ground potential thereon and derives statistics concerning dial tone delay therefrom in lieu of generating test calls as in the prior art, substantially less interference with legitimate telephone calls is encountered.

These and other objects and features of the invention may be more readily comprehended from an examination of the following specification, appended claims, and attached drawing in which:

Figure 1:
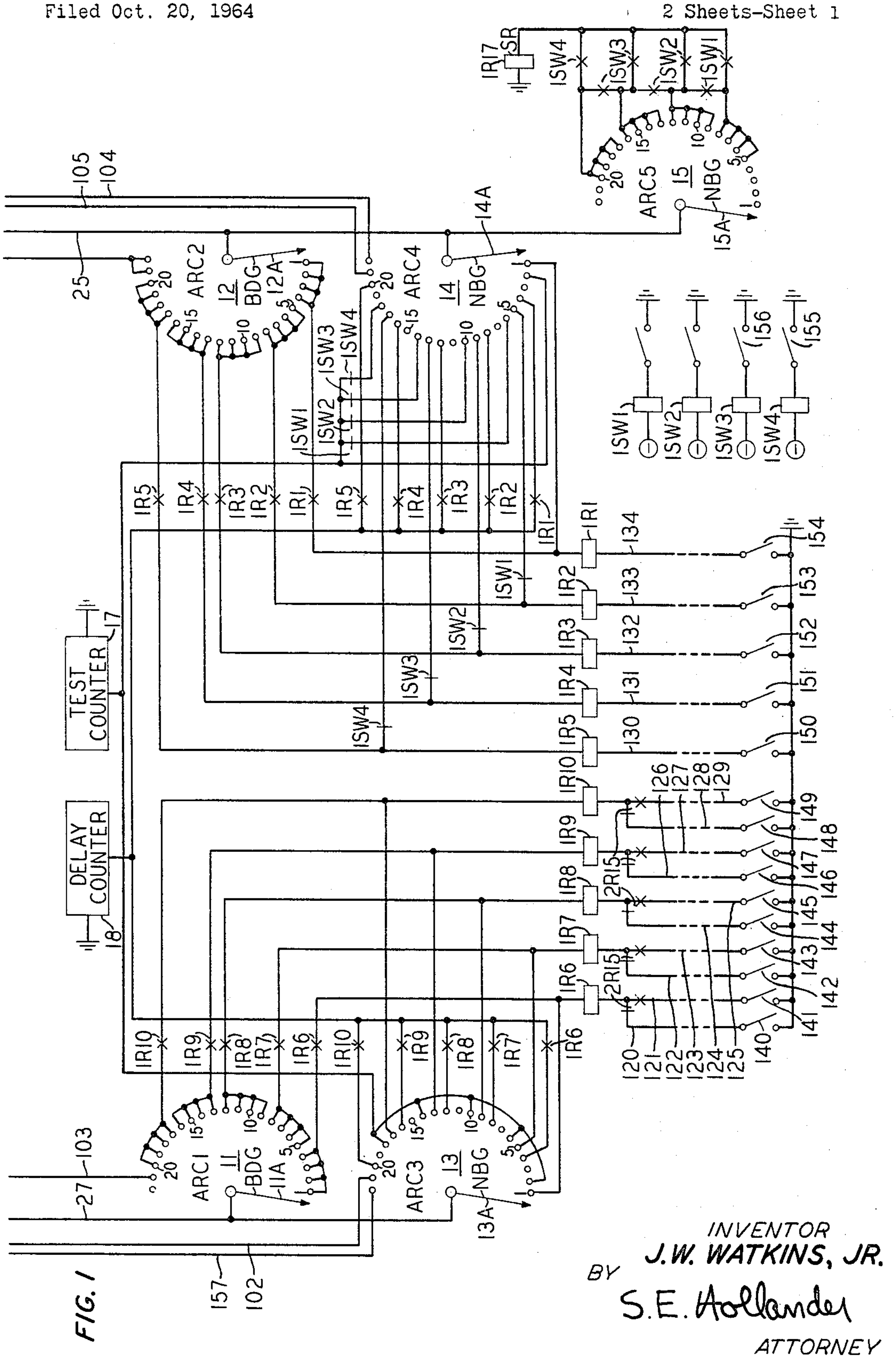
FIG. 1 shows the selector switch banks in detail as well as the delay counter and the test counter in outline form.
Figures 2, 3:
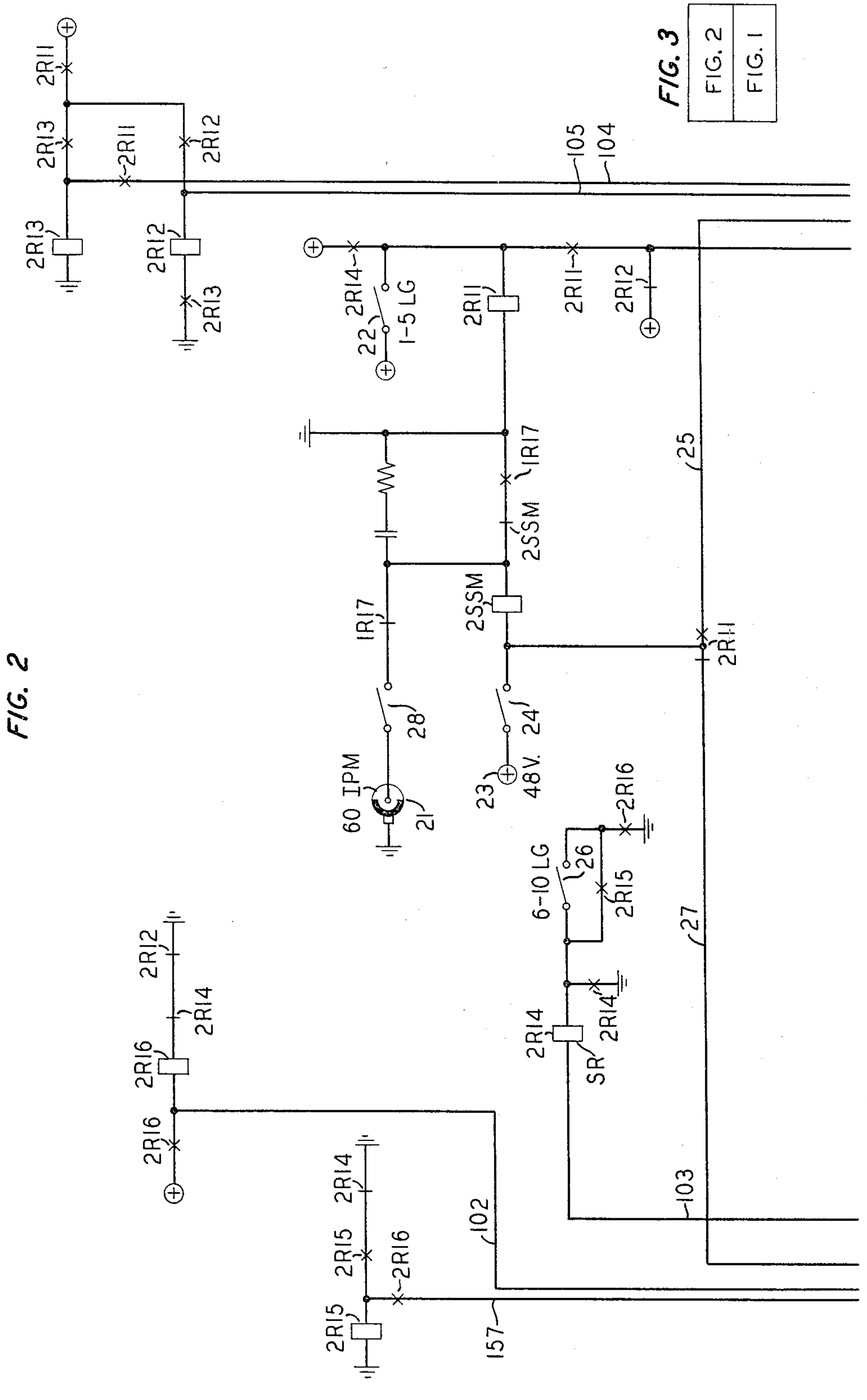
FIG. 2 shows control relays which operate in conjunction with the circuitry of FIG. 1.
FIG. 3 shows the relative disposition of FIGS. 1 and 2.

As shown in FIG. 1, a group of stepping switches 11–15 are all stepped under control of stepping select magnet 2SSM of FIG. 2. A group of conductors 120–134 represent the all-line-finders-busy conductors of fifteen distinct step-by-step telephone line groups. In conventional step-by-step telephone practice a ground condition is applied to the respective conductor when the associated line group has all of the line finders therein busy. The specific manner in which this ground condition is applied is not disclosed herein as not essential to an understanding of the present invention. Reference may be made to the above-reference-to Dimond disclosure for a detailed explanation of this procedure. Switches 140–154 symbolically indicate the application of ground potentials to the respective conductors as indicative of an all-line-finders-busy condition in the associated line group.

*Testing of 1–5 line groups*

Relays 1SW1–1SW4 are energized in accordance with the number of line groups to be tested as shown in the following table:

TABLE I

| Number of line groups tested: | Relays operated |
|---|---|
| 1 | 1SW4, 1SW3, 1SW2, 1SW1. |
| 2 | 1SW4, 1SW3, 1SW2. |
| 3 | 1SW4, 1SW3. |
| 4 | 1SW4. |
| 5 | None. |

Assuming for illustrative purposes that three line groups are to be tested, relays 1SW4 and 1SW3 are operated under control of switches 155 and 156, respectively. Moreover, switch 28 is operated to connect a conventional 60 pulse-per-minute ground source to the selector advance magnet 2SSM. In addition, switch 22 is operated which in turn causes the operation of relay 2R11 over an obvious path. When switch 24 is operated, a path is completed for the period energization of relay 2SSM which may be traced from source 21, switch 28, contacts of relay 1R17, winding of relay 2SSM, switch 24 to source 23. As relay 2SSM, the selector stepping magnet, is energized, brushes 11A–15A on switches 11–15 are periodically advanced at a one terminal per second rate. It is seen that the operation of relay 2R11 causes the application of battery potential from source 23 to the brushes 12A, 14A and 15A. When the brush 14A steps to terminal 1, a path is available from source 23, switch 24, contacts of relay 2R11, conductor 25, brush 14A, terminal 1, winding of relay 1R1, conductor 134, switch 154 to ground. If switch 154 is closed to symbolically indicate a ground condition on the associated all-line-finders-busy conductor 134 (representative of the unavailability due to a busy condition of all line finders in a group), relay 1R1 is operated.

When brush 14A steps to terminal 2 in view of the next energization of relay 2SSM, a path is available over brush 14A from source 23, as described above, and over terminal 2 to test-counter 17 which may be of any suitable conventional type (e.g., Western Electric type 14 message register). It will be noted that if at this time the ground condition persists on conductor 134, relay 1R1 remains operated over its own contacts and terminals 2–4 of switch 12 (brush 12A steps at the same speed as brush 14A, as do all the other brushes). In consequence, although brush 14A subsequently advances to terminal 3 which is blank, relay 1R1 remains operated over the locking path just described. Moreover, on the subsequent energization of relay 2SSM when brush 14A advances to terminal 4, a path is available from source 23 over brush 14A, terminal 4, contacts of relay 1R1 to delay-counter 18 which again may be of the same type as test-counter 17. Since three seconds elapsed between the appearance of brush 14A at terminal 1 and its subsequent appearance at terminal 4, the continued operation of relay 1R1 at the time brush 14A arrives at terminal 4 indicates a dial tone delay of at least three seconds has elapsed which record is thereupon entered in delay-counter 18. This completes the examination of dial tone delay in line group 1.

Subsequently, brush 14A advances to terminal 5 and relay 1R2 is operated over a path similar to that described above for relay 1R1 if the all-line-finders-busy conductor 133 is grounded, indicating the unavaliability of line finders in the group. Similar operations to those described above also occur when brush 14A advances to terminal 6, at which time test counter 17 is again scored, and terminal 8, at which time delay counter 18 is scored over the contacts of relay 1R2 if conductor 133 is still grounded, indicating the persistence of the busy condition.

The testing of the third line group over contacts 9–12 in conjunction wth relay 1R3 is similar to that for the first two line groups. When brush 14A arrives at terminal 13, it is apparent that all subsequent terminals are "open" in view of the previous operation of relays 1SW4 and 1SW3. However, when brush 15A steps to terminal 13, a path exists from battery on brush 15A over the contacts of relay 1SW4 to operate relay 1R17. The contacts of the latter relay interrupt the ground pulses from source 21 and instead complete a continuous ground over the contacts of relay 1R17, contacts of relay 2SSM, winding of relay 2SSM, switch 24 to negative source 23. At this time all of the brushes will spin over the terminals at a faster rate (as the circuit to relay 2SSM is sequentially interrupted by its own contacts) and when brush 15A advances to terminal 21, relay 1R17 will release to restore the 60 pulse-per-minute ground source 21 to the stop magnet 2SSM and to release the ground condition from the interrupter contacts of relay 2SSM. Subsequently, brushes 12A, 14A and 15A return to terminal 1 and the test is repeated in the manner described above. The test registrations and delay registrations will thus continue until the test period is terminated by the opening of switches 24, 28 and 22.

*Testing of 6–10 line groups*

Relays 1SW1–1SW4 are again operated in accordance with the number of line groups over five, to be tested as indicated in the following table:

TABLE II

| Number of line groups tested: | Relays operated |
|---|---|
| 6 | 1SW4, 1SW3, 1SW2, 1SW1. |
| 7 | 1SW4, 1SW3, 1SW2. |
| 8 | 1SW4, 1SW3. |
| 9 | 1SW4. |
| 10 | None. |

Subsequently, to distinguish group 6–10 from group 1–5, switch 26 is operated as well as switches 24 and 28.

Since relay 2R11 is normal, the battery source 23 is now connected over conductor 27 to brushes 11A and 13A. Again, the stepping select magnet 2SSM is energized from source 21 in the manner described above to step all of the brushes over the terminals at one-second intervals. In this manner the line groups associated with conductors 120, 122, 124, 126 and 128 are tested. Thus, for example, when brush 13A arrives at terminal 1, relay 1R6 is energized over a path from negative battery 23, switch 24, contacts of relay 2R11, conductor 27, brush 13A, terminal 1, winding of relay 1R6, contacts of relay 2R15, conductor 120 and switch 140 to ground. As indicated above, the latter switch is closed if the line finders in the associated group are all busy. Thereafter, brush 13A advances to terminal 2 to operate test-counter 17 and subsequent stepping of the brushes tests the lines associated with the line groups under examination in a manner similar to that explained for 1–5 line groups. When brush 13A has stepped to terminal 20, conductors 120, 122, 124, 126 and 128 have been examined and the test registrations and delay registrations have been completed. For purposes of illustration, it will be assumed that a total of eight line groups are being tested.

When the brush 13A steps to terminal 21, a path is provided for the operation of relay 2R16 from battery on brush 13A, conductor 102, winding of relay 2R16, contacts of relays 2R14 and 2R12 to ground. At this time a path for the operation of relay 2R14 is available in FIG. 2 from ground, contacts of relay 2R16, switch 26, winding of relay 2R14, conductor 103, terminal 21, brush 11A to battery over the path traced above. Relay 2R11 operates over an obvious path including the contacts of relay 2R14. Battery is now connected from source 23 over the contacts of relay 2R11 and conductor 25 to feeder brushes 12A, 14A and 15A. Since battery is removed from brushes 11A and 13A, relays 2R14 and 2R16 release. The former relay is a slow-release relay to insure that relay 2R11 will lock operated over terminals 21 and 22 and brush 12A to potential source 23.

Subsequently, all of the brushes step to terminal 22 whereupon relay 2R13 is operated over conductor 104, contacts of relay 2R11, winding of relay 2R13 to ground. Relay 2R13 locks operated over its own contacts and the contacts of relay 2R11. At this time the brushes have returned to terminal 1 and the remaining three line groups are tested in the manner described above for the testing of 1–5 line groups.

When brush 15A steps to terminal 13, relay 1R17 is operated, also in the manner described above, and the selectors are rapidly stepped until terminal 21 is reached. At this time relay 2R12 is operated over brush 14A and conductor 105, winding of relay 2R12, contacts of relay 2R13 to ground. Operation of relay 2R12 opens one locking path for relay 2R11. Subsequently, brush 14A steps off terminal 22 and releases relays 2R11, 2R12 and 2R13. When relay 2R11 is released, battery is reapplied to brushes 11A and 13A and the five line groups associated with switches 11 and 13 which were tested previously are again examined. This procedure will now continue with the examination of the respective line groups in accordance with the operation of relay 2R11.

*Testing of 11–15 line groups*

Relays 1SW1–1SW4 are again operated in accordance with the number of line groups over ten to be tested as indicated in the following table:

TABLE III

| Number of line groups tested: | Relays operated |
|---|---|
| 11 | 1SW4, 1SW3, 1SW2, 1SW1. |
| 12 | 1SW4, 1SW3, 1SW2. |
| 13 | 1SW4, 1SW3. |
| 14 | 1SW4. |
| 15 | None. |

When switches 24 and 28 are operated, relay 2SSM is again periodically energized at one-second intervals from source 21. Assuming in this instance that all fifteen line groups are to be tested, the examination begins with the first five line groups associated with switches 11 and 13 in view of the released condition of relay 2R11. Thus, the line groups associated with conductors 120, 122, 124, 126 and 128 are tested as brushes 11A and 13A proceed from terminals 1–20. When brush 13A advances to terminal 21, a path is available over conductor 102, winding of relay 2R16, contacts of relays 2R14 and 2R12 to ground to operate relay 2R16. Subsequently, when brush 13A advances to terminal 22, relay 2R15 is operated over conductor 157, contacts of relay 2R16, winding of relay 2R15 to ground. Relay 2R15 locks operated over the contacts of relay 2R14. The operation of relay 2R15 causes a transfer of the line group test conductors to conductors 121, 123, 125, 127 and 129. When brush 13A returns to terminal 1, relay 1R6 will be operated if conductor 122 associated with the respective line group is grounded as shown symbolically by the operation of switch 141. The remaining line groups are tested over terminals 5–20 in accordance with the energization of conductors 123, 125, 127 and 129. Corresponding records are stored in the delay-counter 18 and the test-counter 17.

When brush 13A against advances to terminal 21, relay 2R14 is operated over a path including brush 11A, terminal 21, conductor 103, winding of relay 2R14, contacts of relays 2R15 and 2R16 to ground. Operation of relay 2R14 causes the release of relay 2R16 as well as the release of relay 2R15. Relay 2R11 is operated over the contacts of relay 2R14 and locks operated over the contacts of relay 2R12. In view of the operation of relay 2R11, battery is once more applied to the brushes 12A, 14A and 15A. When brush 14A advances to terminal 22, a path is available over conductor 104 and the contacts of relay 2R11 to operate relay 2R13. The latter relay locks operated over its own contacts and the contacts of relay 2R11.

At this time the line groups associated with conductors 130–134 are tested as brush 14A steps from terminal 1 to terminal 20 (assuming all fifteen line groups are to be tested). When brush 14A advances to terminal 21, relay 2R12 is operated over conductor 105, winding of relay 2R12, contacts of relay 2R13 to ground. When brush 14A steps off terminal 22, relays 2R11, 2R12 and 2R13 are released. Thereupon, battery is once more applied to the brushes 11A and 13A and the entire cycle is repeated.

It will be understood that switch 15 provides for maximizing the number of test indications possible during a particular time period whenever the number of line groups to be tested is less than a multiple of five. Thus, as explained above for the testing of three and eight line groups, relay 1R17 is operated when the brush 15A steps to terminal 13. Thereafter, the switch rotor spins at a rapid rate over the terminals as the winding of relay 2SSM is energized sequentially over its own contacts until terminal 21 is reached whereupon battery is no longer connected to relay 1R17, allowing the relay to release and to restore the interrupter source 21 to step magnet 2SSM, whereupon subsequent advances by the brushes are at a one terminal per second rate.

It is to be understood that the above-described arrangements are illustrative of the application of the principles of the invention. Numerous other arrangements may be devised by those skilled in the art without departing from the spirit and scope of the invention.

What is claimed is:

1. A dial tone delay measuring circuit for use in telephone systems having signaling apparatus for indicating the busy or idle condition of common dial pulse controlled equipment including first means responsive to signals indicative of a busy condition at said equipment, second means responsive to the continued operation of said first means for a predetermined time interval, and delay counter means responsive to said second means for recording the incidence of dial tone delay in excess of said interval.

2. A dial tone delay testing circuit for use in telephone systems having dial pulse controlled means comprising first means responsive to signals indicative of a busy condition, said first means including a plurality of terminals individual to corresponding dial pulse controlled means, means for sequentially examining said terminals for said signals, test counting means for registering said examinations, and delay counting means responsive to the persistence of said signals on said terminals for a predetermined interval for recording the incidence of dial tone delay in excess of said interval.

3. A dial tone delay measuring system for use in a step-by-step telephone system having a plurality of all-line-finders-busy conductors for receiving signals indicative of all-line-finders-busy conditions comprising in combination a plurality of terminals individually connected to said conductors, stepping selector means connectable to said terminals for sequentially scanning said terminals for the appearance of said signals thereon, means responsive to the detection of a signal on one of said terminals indicative of an all-line-finders-busy condition for temporarily storing said indication, delay counting means, and additional means jointly responsive to the advance of said selector means to a subsequent terminal and to the continued storage of said indication for operating said delay counting means.

4. A dial tone delay measuring system for use in a step-by-step telephone system in accordance with claim 3 wherein said means for temporarily storing said signal indication includes relay means connected intermediate said one terminal and said corresponding all-line-finders-busy conductor.

5. A telephone dial tone delay testing system for use in a step-by-step telephone system having a plurality of conductors for receiving signals indicative of the busy or idle condition of common dial pulse controlled equipment comprising a first group of stepping selector means for scanning a portion of said conductors, a second group of stepping selector means for scanning said remaining conductors, first relay means having relay contacts and responsive to the advance of said selectors in said first group to a conductor having a busy signal thereon, delay counting means, means responsive to the advance of said selector means for operating said delay counting means over the contacts of said first relay means, and second relay means responsive to the completion of scanning of said conductors connected to said first selector means for energizing said selector means in said second group to scan said remaining conductors.

6. A telephone dial tone delay testing system for use in a step-by-step telephone system in accordance with claim 5 wherein said portion of said conductors include a first and second group of conductors, and wherein said first selector means includes means responsive to the completion of scanning of said conductors in said first group for subsequently disconnecting said conductors from said first selector means and for thereafter scanning said conductors in said second group.

7. A telephone dial tone delay testing system for use in a step-by-step telephone system in accordance with claim 5 including in addition means responsive to the completion of scanning at a particular rate of certain of said lines connected to said second selector means for recycling said second selector means at a faster rate to rescan only said certain lines.

8. A telephone dial tone delay testing system for use in a step-by-step telephone system in accordance with claim 7 wherein said recycling means includes additional stepping selector means having a number of terminals equal to said terminals in said second selector means, and means responsive to the advance of said additional selector means to a preselected terminal for controlling said second selector means to recycle to an initial terminal.

9. A dial tone delay measuring system for use in step-by-step telephone systems having a plurality of conductors individually representative of all-line-finders-busy conditions in associated line groups including relay means individually connectable to said conductors, contacts controlled by said relay means, stepping selector means connectable to said relay means for energizing said relay means when said associated conductor has a signal thereon indicative of an all-line-finders-busy condition, means for advancing said selector means at a uniform rate, delay counting means, additional means responsive to the advance of said selector means for operating said delay counting means over the contacts of said relay means if said relay means remains operated during the time period required for said advance, test counting means, and means responsive to the sequential advance of said stepping selector means for operating said test counting means.

References Cited

UNITED STATES PATENTS

| | | | |
|---|---|---|---|
| 2,405,339 | 8/1946 | Willis. | |
| 2,393,403 | 1/1946 | Ostline | 179—8.6 |
| 2,708,691 | 5/1955 | Molnar | 179—8.6 |
| 3,169,169 | 2/1965 | Sigo | 179—8.6 |

KATHLEEN H. CLAFFY, *Primary Examiner.*

L. A. WRIGHT, *Assistant Examiner.*